United States Patent
Paek et al.

(10) Patent No.: US 8,330,898 B2
(45) Date of Patent: Dec. 11, 2012

(54) FLEXIBLE LIQUID CRYSTAL DISPLAY DEVICE

(75) Inventors: Seung-han Paek, Incheon (KR); Sung-hwan Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 612 days.

(21) Appl. No.: 12/559,857

(22) Filed: Sep. 15, 2009

(65) Prior Publication Data

US 2010/0141872 A1    Jun. 10, 2010

(30) Foreign Application Priority Data

Dec. 4, 2008   (KR) .................. 10-2008-0122371

(51) Int. Cl.
G02F 1/1335   (2006.01)
G02F 1/1333   (2006.01)
(52) U.S. Cl. ........................................ 349/69; 349/122
(58) Field of Classification Search .................... 349/61, 349/69, 158, 122
See application file for complete search history.

(56) References Cited

U.S. PATENT DOCUMENTS

| | | | |
|---|---|---|---|
| 6,987,547 B2 | 1/2006 | Yang et al. | |
| 2002/0196387 A1* | 12/2002 | Kimura | 349/61 |
| 2003/0109286 A1 | 6/2003 | Hack et al. | |
| 2004/0183958 A1* | 9/2004 | Akiyama et al. | 349/58 |
| 2005/0007517 A1 | 1/2005 | Anandan | |
| 2006/0176417 A1* | 8/2006 | Wu et al. | 349/58 |
| 2007/0030571 A1 | 2/2007 | Yeh et al. | |
| 2007/0291199 A1* | 12/2007 | Choo et al. | 349/69 |
| 2008/0084520 A1* | 4/2008 | Nam et al. | 349/65 |

FOREIGN PATENT DOCUMENTS

| | | |
|---|---|---|
| CN | 1406343 | 3/2003 |
| JP | 2008-277047 | 11/2008 |
| KR | 10-2008-0073942 | 8/2008 |
| TW | 200708193 | 2/2007 |

* cited by examiner

Primary Examiner — Nathanael R Briggs
(74) Attorney, Agent, or Firm — Morgan, Lewis & Bockius LLP

(57) ABSTRACT

A flexible liquid crystal display device includes a first flexible substrate having a display region and a non-display region at a periphery of the display region; an organic electroluminescent diode including a first electrode on the first flexible substrate, an organic emitting layer on the first electrode and a second electrode on the organic emitting layer, wherein each of the first electrode, the organic emitting layer and the second electrode covering an entire surface of the display region; a buffer layer on the organic electroluminescent diode; a gate line on the buffer layer; a data line over the buffer layer and crossing the gate line to define a pixel region at the display region; a thin film transistor connected to the gate and data lines; a pixel electrode connected to the thin film transistor; a second flexible substrate facing the first flexible substrate; a common electrode on the second flexible substrate; and a liquid crystal layer between the pixel and common electrodes.

20 Claims, 5 Drawing Sheets

FLEXIBLE LIQUID CRYSTAL DISPLAY DEVICE

The present application claims the benefit of Korean Patent Application No. 10-2008-0122371 filed in Korea on Dec. 4, 2008, which is hereby incorporated by reference.

BACKGROUND OF THE INVENTION

1. Field of the Invention

The present invention relates to a liquid crystal display (LCD) device and more particularly to an LCD device having advantages in weight and thickness and being flexible.

2. Discussion of the Related Art

As the society has entered in earnest upon an information age, flat panel display devices, which have excellent capabilities of a thin profile, light weight and low power consumption, and so on, are introduced. For example, the flat panel display devices include an LCD device, a plasma display panel (PDP) device, a vacuum fluorescent display (VFD) device and an electroluminescent display (ELD) device.

Among these devices, LCD devices are widely used for notebook computers, monitors, TV, and so on instead of a cathode ray tube (CRT), because of their high contrast ratio and characteristics adequate to display moving images.

The LCD device uses optical anisotropy and polarization properties of liquid crystal molecules. The liquid crystal molecules have a definite alignment direction as a result of their thin and long shapes. The alignment direction of the liquid crystal molecules can be controlled by application of an electric field across the liquid crystal molecules. As the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity.

Since the LCD device including a thin film transistor (TFT) as a switching element, referred to as an active matrix LCD (AM-LCD) device, has excellent characteristics such as high resolution and display of moving images, the AM-LCD device has been widely used.

FIG. 1 is a schematic cross-sectional view of the related art LCD device. In FIG. 1, the LCD device 1 includes first and second substrates 5 and 10, a liquid crystal layer 15 and a backlight unit 90. The first and second substrates 5 and 10 face each other, and the liquid crystal layer 15 is interposed between the first and second substrates 5 and 10. The backlight unit 90 is disposed under the first substrate 5. A combination of the first and second substrates 5 and 10 and the liquid crystal layer 15 may be called as a liquid crystal panel 30. For example, each of the first and second substrates 5 and 10 may be formed of a transparent glass.

On the first substrates 5, a pixel region P, which is defined by gate and data lines (not shown) crossing each other, and a switching region S, where a thin film transistor (TFT) T as a switching element is formed, are defined. The TFT T is disposed at a crossing portion of the gate and data lines. The TFT T includes a gate electrode 25, a gate insulating layer 45, a semiconductor layer 40, a source electrode 32 and a drain electrode 34. The semiconductor layer 40 may include an active layer of intrinsic amorphous silicon and an ohmic contact layer of impurity-doped amorphous silicon.

A passivation layer 55 is formed on the TFT T and includes a drain contact hole DCH exposing the drain electrode 34. In addition, a pixel electrode 70 connected to the drain electrode 34 through the drain contact hole DCH is formed on the passivation layer 55 in each pixel region P. For example, the pixel electrode 70 may be formed of a transparent conductive material such as indium-tin-oxide (ITO) and indium-zinc-oxide (IZO).

On the second substrate 10, a black matrix 12 for shielding the gate and data lines and the TFT T on the first substrate is formed. A color filter layer 16 including red (R), green (G) and blue (B) sub-color filters 16a, 16b and 16c is formed on the black matrix 12. The sub-color filters 16a, 16b and 16c correspond to each pixel region P. In addition, a common electrode 75 is formed on the color filter layer 16. For example, the common electrode 75 may be formed of a transparent conductive material such as ITO and IZO. Although not shown, first and second alignment layers may be formed on the pixel electrode 70 and the common electrode 75, respectively.

Liquid crystal molecules L in the liquid crystal layer 15 is driven by a vertical electric field induced between the pixel and common electrodes 70 and 75 such that light transmissivity is controlled. The light is provided from the backlight unit 90. Color images are displayed due to the color filter layer 16.

The backlight unit 90 includes one of a cold cathode fluorescent lamp (CCFL), a hot cathode fluorescent lamp (HCFL), an external electrode fluorescent lamp (EEFL) and a light emitting diode (LED) as a light source. The backlight unit 90 further includes members depending on a kind of the light source. For example, the backlight unit 90 may include a reflective sheet and an optical sheet.

Recently, a flexible substrate, for example, a plastic or a flexible metal substrate, is used for each of the first and second substrates 5 and 10 to obtain a flexible LCD device. Unfortunately, the backlight unit 90 is formed of rigid material, for example, a glass substrate, such that there is a limitation to provide a flexible LCD device.

SUMMARY OF THE INVENTION

Accordingly, the present invention is directed to a flexible LCD device that substantially obviates one or more of the problems due to limitations and disadvantages of the related art.

An object of the present invention is to provide a flexible LCD device including a flexible organic electroluminescent diode as a light source.

An object of the present invention is to provide a thinner and lighter flexible LCD device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a flexible liquid crystal display device includes a first flexible substrate having a display region and a non-display region at a periphery of the display region; an organic electroluminescent diode including a first electrode on the first flexible substrate, an organic emitting layer on the first electrode and a second electrode on the organic emitting layer, wherein each of the first electrode, the organic emitting layer and the second electrode covering an entire surface of the display region; a buffer layer on the organic electroluminescent diode; a gate line on the buffer layer; a data line over the buffer layer and crossing the gate line to define a pixel region at the display region; a thin film transistor connected to the gate and data lines; a pixel electrode connected to the thin film transistor; a second flexible substrate facing the first flexible substrate; a common electrode on the second flexible substrate; and a liquid crystal layer between the pixel and common electrodes.

In another aspect of the present invention, a flexible liquid crystal display device includes a first flexible substrate having a display region, pixel regions in the display region and a non-display region at a periphery of the display region; a driving element in each pixel region; an organic electroluminescent diode in each pixel region and including a first electrode connected to the driving element, an organic emitting layer on the first electrode and a second electrode on the organic emitting layer, wherein each of the first electrode and the organic emitting layer has an island shape, and the second electrode covering an entire surface of the display region; a buffer layer on the organic electroluminescent diode; a gate line on the buffer layer; a data line over the buffer layer and crossing the gate line to define a pixel region at the display region; a thin film transistor connected to the gate and data lines; a pixel electrode connected to the thin film transistor; a second flexible substrate facing the first flexible substrate; a common electrode on the second flexible substrate; and a liquid crystal layer between the pixel and common electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 1:
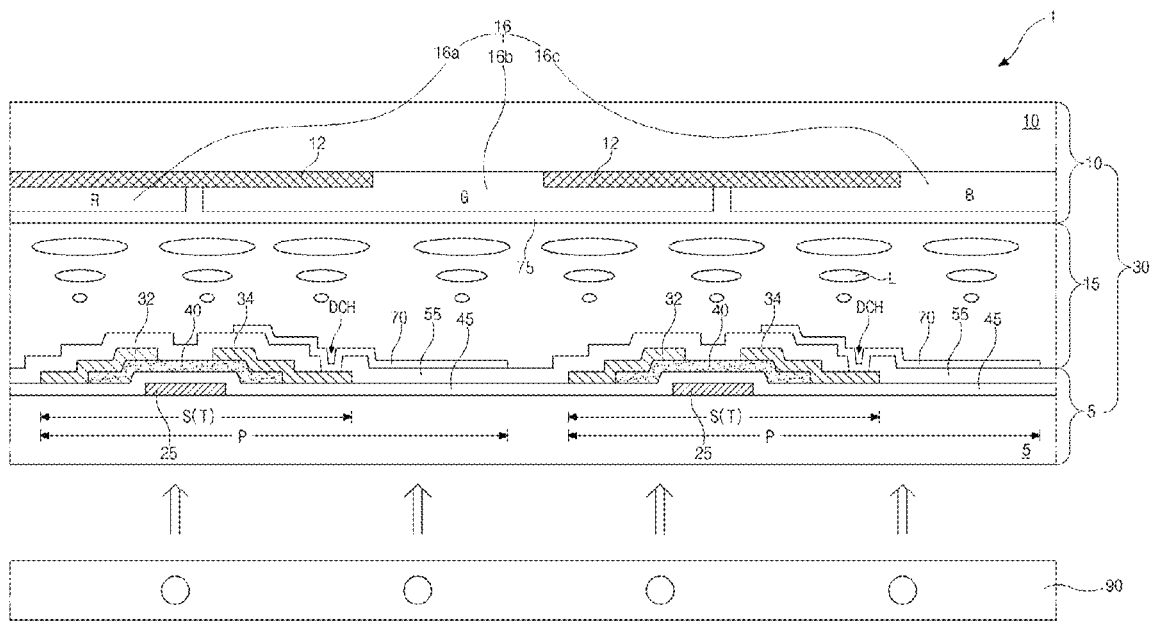
FIG. 1 is a schematic cross-sectional view of the related art LCD device.
Figure 2:
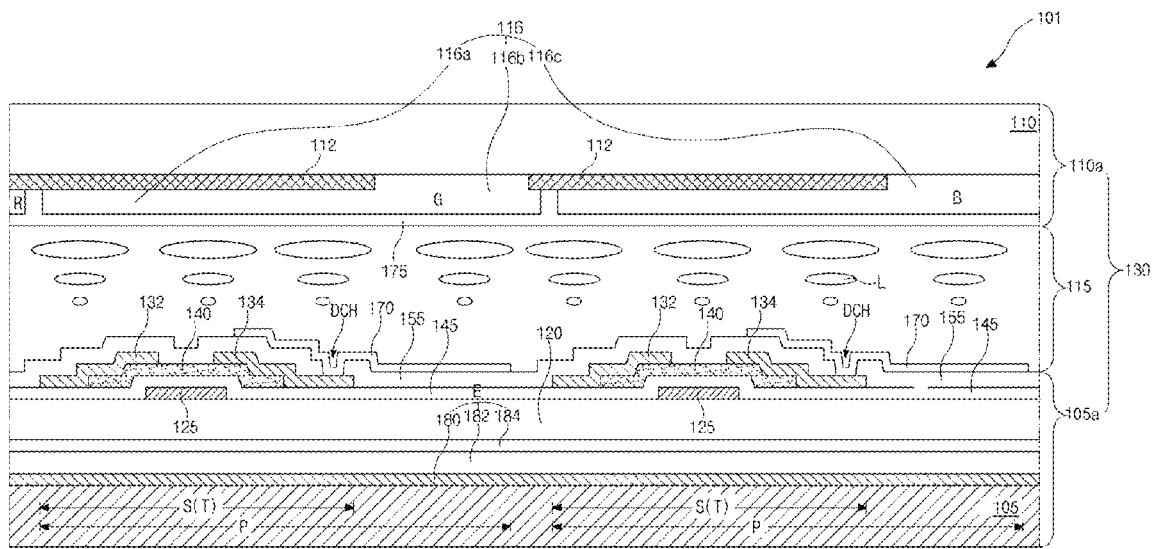
FIG. 2 is a cross-sectional view of a flexible LCD device according to a first embodiment of the present invention.

FIG. 2 is a cross-sectional view of a flexible LCD device according to a first embodiment of the present invention, and FIGS. 3A to 3D are cross-sectional view for illustrating a fabricating process of a flexible LCD device according to the first embodiment of the present invention. In FIGS. 2 and 3A to 3D, an LCD device 101 includes TFT substrate 105a and color filter substrate 110a and a liquid crystal layer 115. The TFT substrate 105a and color filter substrate 110a face each other, and the liquid crystal layer 115 is interposed between the TFT substrate 105a and color filter substrate 110a. Both the TFT substrate 105a and color filter substrate 110a are flexible. A combination of the TFT substrate 105a and color filter substrate 110a and the liquid crystal layer 115 may be called as a liquid crystal panel 130. Liquid crystal molecules L are driven by a vertical electric field. Furthermore, liquid crystal molecules L can be driven by a horizontal electric field.

A display region AA for displaying images and a non-display region NAA at a periphery of the display region AA are defined on a first substrate 105. On the first substrate 105, an organic electroluminescent diode E as a light source, a buffer layer 120 and an array element A are formed. The organic electroluminescent diode E is passive matrix type. The passive matrix type organic electroluminescent diode E includes a first electrode 180 on an entire surface of the display region AA, an organic emitting layer 182 on the first electrode 180 and a second electrode 184 on the organic emitting layer 182. The organic electroluminescent diode E is selectively turned on or off by a driving signal from an inverter (not shown). Namely, an operation of the organic electroluminescent diode E is controlled by the inverter. The first electrode 180 is formed of a first metallic material having a relatively low work function, while the second electrode 184 is formed of a second metallic material having a relatively high work function. For example, the first metallic material may include one of calcium (Ca), magnesium (Mg) and aluminum (Al), and the second metallic material may include one of ITO and IZO. Since the first electrode 180 is formed of the first metallic material having a low work function, a barrier between the first electrode 180 and the organic emitting layer 182 is decreased such that a high current density can be obtained.

The first electrode 180 is opaque and serves as a cathode, while the second electrode 184 is transparent and serves as an anode. Light, which is emitted by re-combination of electrons and holes in the organic emitting layer 182, passes through the second electrode 184. This may be called as a top emission type. The organic emitting layer 182 is formed of an organic material being capable of emitting a white light. Since the electroluminescent diode E is formed on an entire surface of the display region AA, a plane light source is provided onto an entire area of a second substrate 110.

Although not shown in FIG. 2, ends of the electroluminescent diode E is covered with a sealing material pattern at edges of the non-display region NAA. The sealing material pattern may be formed of a transparent sealing material, for example, sealant, photo-acryl or polyimide.

The first substrate 105 is formed of one of plastic, metal or a metallic foil to be flexible. The first substrate 105 may be opaque. The second substrate 110 is formed of a plastic material which is flexible and transparent. For example, when each of the first and second substrates 105 and 110 is formed of a plastic material, a polymer, such as polyethyleneterephthalate (PET), polyethersulphone (PES), polyimide (PI) and polyehylenenaphthalate (PEN), is used. The plastic-based substrates 105 and 110 may have a multiple-stack layered structure to obtain improvement in a moisture absorption property or an anti-oxidization property. The metal or metallic foil for the first substrate 105 may be iron, iron alloy, Al or Al alloy.

The buffer layer 120 is formed on the electroluminescent diode E. The buffer layer 120 is formed of an inorganic insulating material, such as silicon oxide ($SiO_2$) and silicon nitride (SiNx), or an organic insulating material, such as benzocyclobutene, photo-acryl and polyimide. The buffer layer 120 may have a double-layered structure of an inorganic insulating material and an organic insulating material.

The array element A is formed on the buffer layer 120. The array element A includes a gate line (not shown) and a data line (not shown), a TFT T and a pixel electrode 170. The gate and data lines cross each other to define a pixel region P in the display region AA. The TFT T is formed at a crossing portion of the gate and data lines. The TFT T is connected to the gate and data lines. The TFT T includes a gate electrode 125, a gate insulating layer 145, a semiconductor layer 140, a source electrode 132 and a drain electrode 134. The gate electrode 125 is connected to the gate line, and the source electrode 132 is connected to the data line. The semiconductor layer 140 may include a single layer of polycrystalline silicon. Alternatively, the semiconductor layer 140 may include double layers of an active layer of intrinsic amorphous silicon and an ohmic contact layer of impurity-doped amorphous silicon. The drain electrode 134 is spaced apart from the source electrode 132.

A passivation layer 155 is formed on the TFT T and includes a drain contact hole DCH exposing the drain electrode 134. In addition, a pixel electrode 170 connected to the drain electrode 134 through the drain contact hole DCH is formed on the passivation layer 155 in each pixel region P. For example, the pixel electrode 170 may be formed of a transparent conductive material such as indium-tin-oxide (ITO) and indium-zinc-oxide (IZO).

On the second substrate 110, a black matrix 112 for shielding the gate and data lines and the TFT T on the first substrate is formed. A color filter layer 116 including red (R), green (G) and blue (B) sub-color filters 116a, 116b and 116c is formed on the black matrix 112. The sub-color filters 116a, 116b and 116c correspond to each pixel region P. In addition, a common electrode 175 is formed on the color filter layer 116. For example, the common electrode 175 may be formed of a transparent conductive material such as ITO and IZO. Although not shown, first and second alignment layers may be formed on the pixel electrode 170 and the common electrode 175, respectively.

Since the electroluminescent diode E as a light source is on the first substrate 105 with the array element A, a backlight unit under a lower substrate is not required such that the LCD device has advantages in thickness and weight. In addition, since the LCD device 101 does not require a rigid backlight unit, the LCD device 101 is flexible. Moreover, since the electroluminescent diode E is a passive type, the electroluminescent diode E can be formed by a heat-evaporation depositing method such that a fabricating process for the electroluminescent diode E can be simplified. Furthermore, there is also an advantage on a fabricating process of the electroluminescent for a large size substrate. Since the electroluminescent diode E serves as a light source, the LCD device 101 does not require a reflective sheet and an optical sheet such that a thickness of the LCD device 101 is further reduced.

Figure 3A:
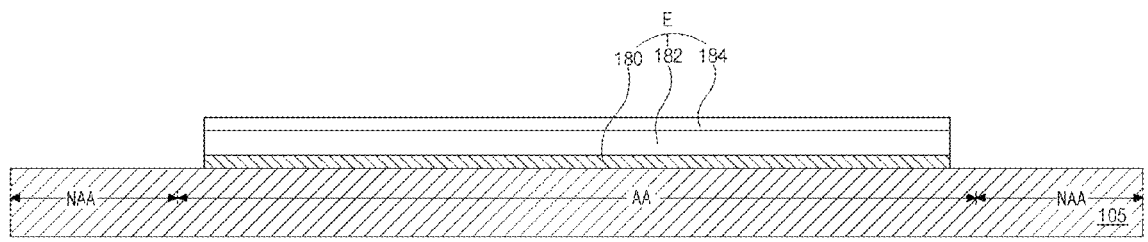
FIGS. 3A to 3D are cross-sectional view for illustrating a fabricating process of a flexible LCD device according to the first embodiment of the present invention.
Figure 3B:
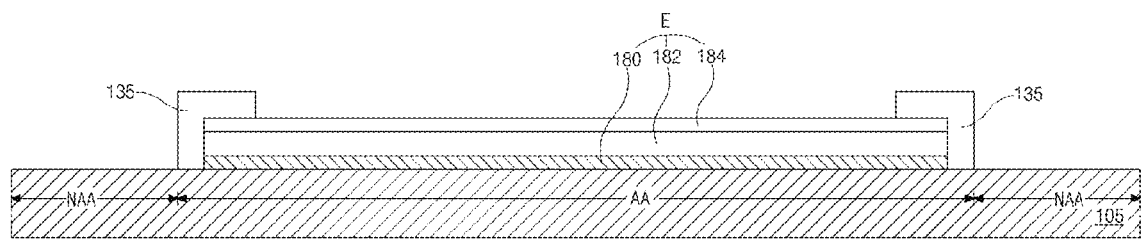
Figure 3C:
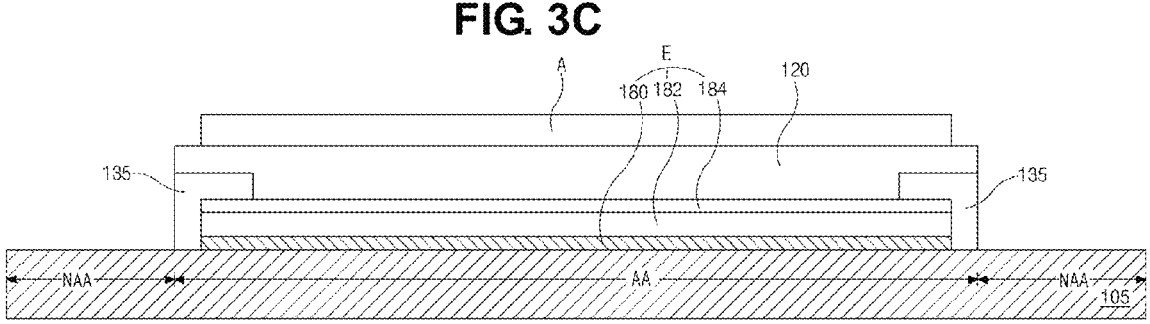
Figure 3D:
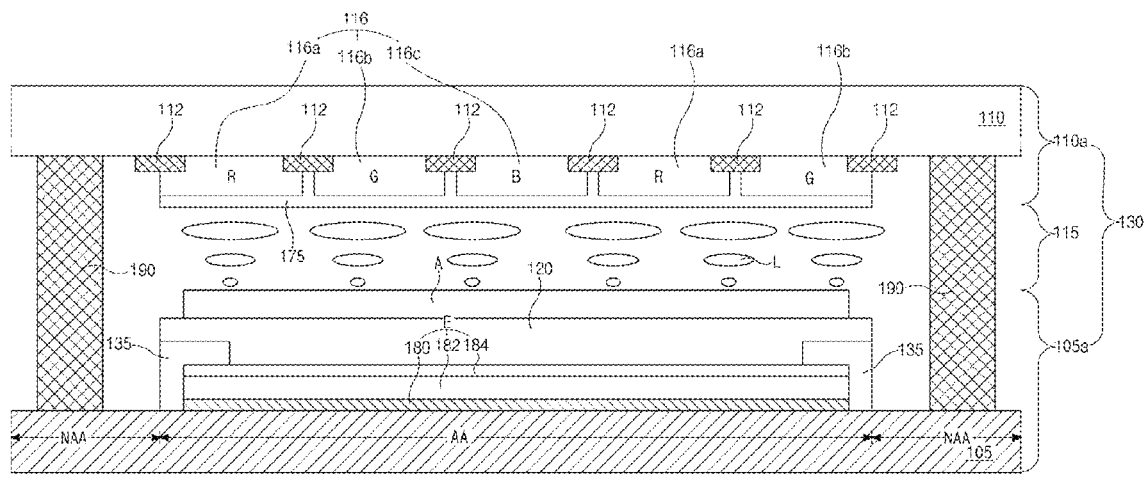
Figure 4A:
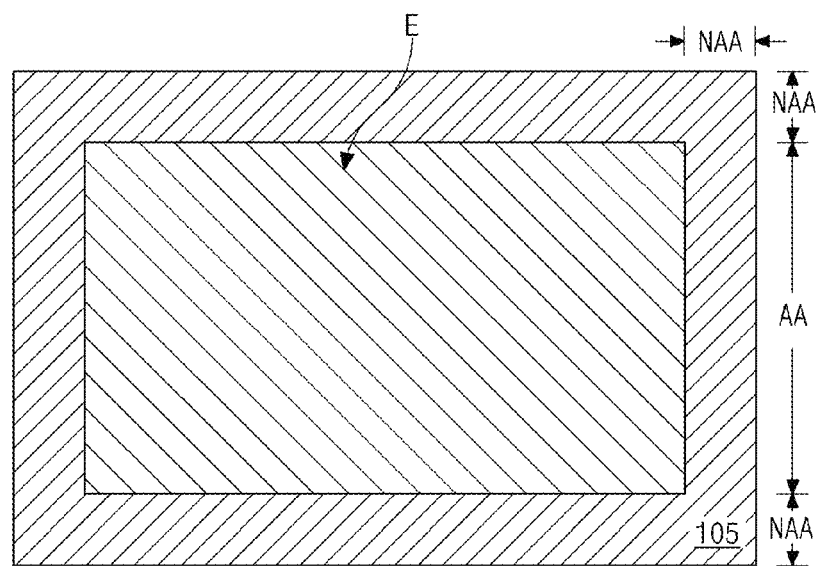
FIGS. 4A and 4B are plan views for illustrating a fabricating process in FIGS. 3A and 3B.
Figure 4B:
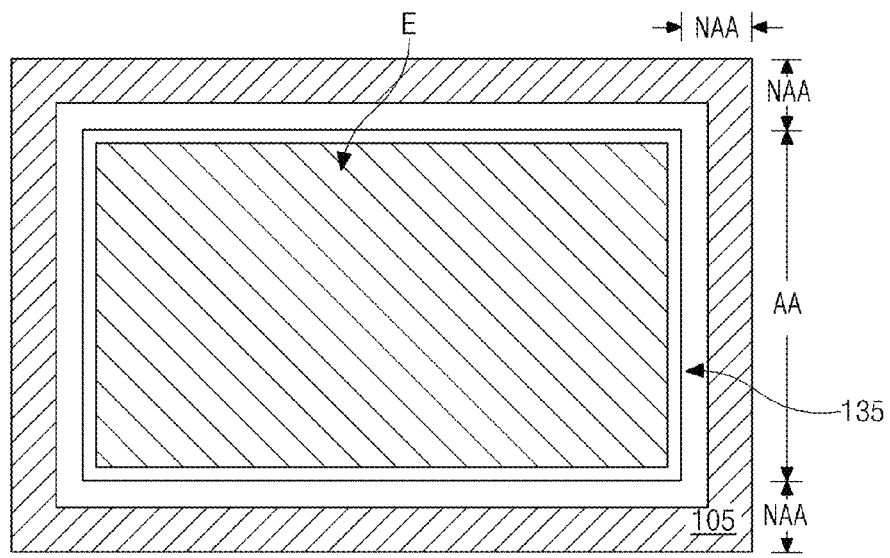

Referring to FIGS. 3A to 3D and FIGS. 4A and 4B, a fabricating process of a flexible LCD device according to the first embodiment of the present invention is illustrated. FIGS. 4A and 4B are plan views for illustrating a fabricating process in FIGS. 3A and 3B.

In FIGS. 3A and 4A, the first electrode 180 is formed on an entire surface of the display region AA of the first substrate 105 by depositing one or two selected from a metallic material group having a relatively low work function. For example, the metallic material group may include powder type calcium (Ca), magnesium (Mg) and aluminum (Al). On the first substrate 105, the display region AA and the non-display region NAA are defined. In the display region AA, the pixel region P, which is defined by crossing gate and data lines, and a switching region S(T) (of FIG. 2), where the TFT T (of FIG. 2) is formed, are defined. The first substrate 105 is formed of one of plastic, metal or a metallic foil to be flexible. For example, when the first substrate 105 is formed of a plastic material, a polymer, such as polyethyleneterephthalate (PET), polyethersulphone (PES), polyimide (PI) and polyehylenenaphthalate (PEN), is used. The plastic-based substrates 105 and 110 may have a multiple-stack layered structure to obtain improvement in a moisture absorption property or an anti-oxidization property. The metal or metallic foil for the first substrate 105 may be iron, iron alloy, Al or Al alloy.

Next, the organic emitting layer 182 is formed on the first electrode 180 and on the entire surface of the display region AA by depositing an organic material. The organic emitting layer 182 emits white light. The second electrode 184 is formed on the organic emitting layer 182 and the entire surface of the display region AA by depositing one of a transparent conductive material group. For example, the transparent conductive material group may include powder type ITO and IZO. A material of the second electrode 184 has a greater work function than that of the first electrode 180. The first electrode 180, the organic emitting layer 182 and the second electrode 184 have substantially the same shape as one another. The first electrode 180, the organic emitting layer 182 and the second electrode 184 constitute the organic electroluminescent diode E. The first electrode 180, the organic emitting layer 182 and the second electrode 184 are formed in a single process chamber by a heat-evaporation depositing method or a spin coating method.

In FIGS. 3B and 4B, a sealing material pattern 135 is formed on the first substrate 105. The sealing material pattern 135 covers edges of the organic electroluminescent diode E to protect the organic electroluminescent diode E. Particularly, the sealing material pattern 135 covers a side surface of the organic emitting material layer 182. The sealing material pattern 135 may be positioned at boundaries of the display region AA and the non-display region NAA. The sealing material pattern 135 may be formed of a transparent sealing material, for example, sealant, photo-acryl or polyimide.

In FIG. 3C, a buffer layer 120 is formed on the sealing material pattern 135 and the organic electroluminescent diode E. The buffer layer 120 may correspond to the entire surface of the display region AA. The buffer layer 120 is formed of an inorganic insulating material, such as silicon oxide ($SiO_2$) and silicon nitride (SiNx), or an organic insulating material, such as benzocyclobutene, photo-acryl and polyimide. The buffer layer 120 may have a double-layered structure of an inorganic insulating material and an organic insulating material. Alternatively, a buffer sheet of plastic may be laminated over the organic electroluminescent diode E with an adhesive layer. The sealing material pattern 135 and the buffer layer 120 can obtain improvement for the organic electroluminescent diode E in a moisture absorption property or an anti-oxidization property.

Next, the array element A, which includes the gate and data lines, the TFT, the passivation layer and the pixel electrode, is formed on the buffer layer 120. As mentioned above, the gate and data lines cross each other to define the pixel region P. The TFT is disposed at a crossing portion of the gate and data line and located in the switching region S(T). The passivation layer includes the drain contact hole exposing the drain electrode of the TFT, and the pixel electrode is connected to the drain electrode through the drain contact hole.

In FIG. 3D, the black matrix 112 having a lattice shape is formed on the second substrate 110. The black matrix 112 corresponds to and shields the gate and data lines and the TFT on the first substrate 105. The black matrix 112 has an opening corresponding to the pixel region P. The color filter layer 116 including red (R), green (G) and blue (B) sub-color filters 116a, 116b and 116c is formed in the opening of the black matrix 112. Namely, each of the red (R), green (G) and blue (B) sub-color filters 116a, 116b and 116c corresponds to the pixel region P. The common electrode 175 is formed on the color filter layer 116 by depositing a transparent conductive material, for example, ITO or IZO.

Next, a seal pattern 190 is formed in the non-display region NAA and on one of the first and second substrates 105 and 110 by coating a sealant. Then, the first and second substrates 105 and 110 are disposed to face each other and attached with irradiating UV light to harden the seal pattern 190. Namely, a space between the first and second substrates 105 and 110 is sealed by the seal pattern 190. Next, the liquid crystal layer 115 is injected into a space between the first and second substrates 105 and 110. Alternatively, the liquid crystal layer 115 may be formed before a step of attaching the first and second substrates 105 and 110.

Figure 5:
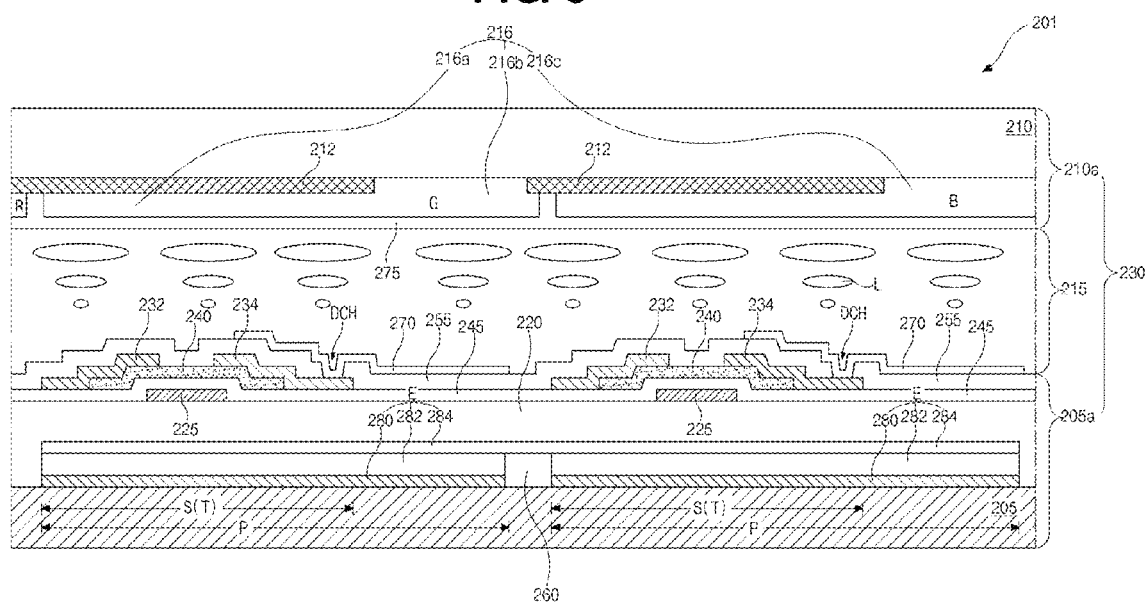
FIG. 5 is a cross-sectional view of a flexible LCD device according to a second embodiment of the present invention.

FIG. 5 is a cross-sectional view of a flexible LCD device according to a second embodiment of the present invention. In the second embodiment, the organic electroluminescent diode of an active matrix type serves as a light source. The explanation is focused on the organic electroluminescent diode.

In FIG. 5, an LCD device 201 includes TFT substrate 205a and color filter substrate 210a and a liquid crystal layer 215. The TFT substrate 205a and color filter substrate 210a face each other, and the liquid crystal layer 215 is interposed between the TFT substrate 205a and color filter substrate 210a. A combination of the TFT substrate 205a and color filter substrate 210a and the liquid crystal layer 215 may be called as a liquid crystal panel 230. Liquid crystal molecules L are driven by a vertical electric field. Furthermore, liquid crystal molecules L can be driven by a horizontal electric field.

In the second embodiment, an organic electroluminescent diode E of an active matrix type is used as a light source. The active matrix type organic electroluminescent diode E includes a first electrode 280 on the first substrate 205, an organic emitting layer 282 on the first electrode 280 and a second electrode 284 on the organic emitting layer 282. The first electrode 280 and the organic emitting layer 282 are disposed in each pixel region P, while the second electrode 284 is disposed in an entire area of the display region AA. Namely, the first electrode 280 in one pixel region P is separated from the first electrode 280 in adjacent pixel region P. Similarly, the organic emitting layer 282 in one pixel region P is separated from the organic emitting layer 282 in adjacent pixel region P. Each of the first electrode 280 and the organic emitting layer 282 has an island shape. Meanwhile, the second electrode 284 in one pixel region P is continuous from the second electrode 284 in adjacent pixel region P. The organic emitting layer 282 can be isolated due to a bank 260 at boundaries of the pixel region P. Other elements have the same structure as those in the first embodiment.

Since the electroluminescent diode E as a light source is on the first substrate 205 with the array element A, a backlight unit under a lower substrate is not required such that the LCD device has advantages in thickness and weight. In addition, since the LCD device 201 does not require a rigid backlight unit, the LCD device 201 is flexible. Moreover, since the electroluminescent diode E serves as a light source, the LCD device 201 does not require a reflective sheet and an optical sheet such that a thickness of the LCD device 201 is further reduced.

Figure 6:
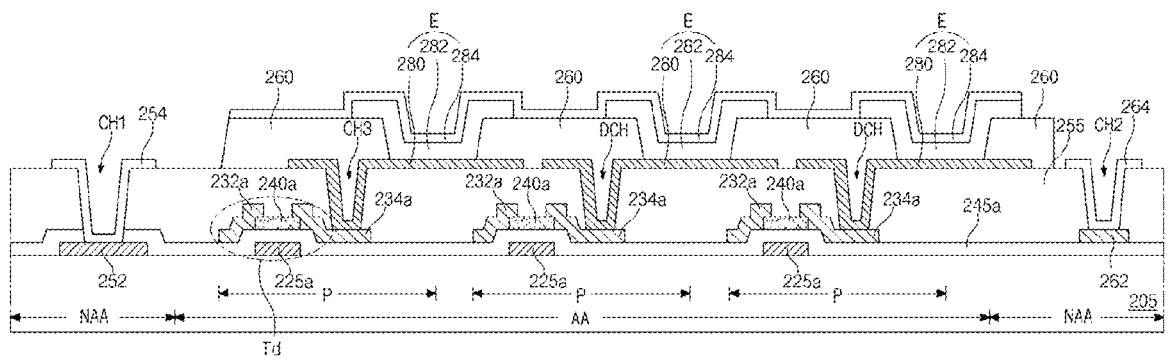
FIG. 6 is a cross-sectional view of an organic electroluminescent diode for a flexible LCD device according to the second embodiment of the present invention.

FIG. 6 is a cross-sectional view of an organic electroluminescent diode for a flexible LCD device according to the second embodiment of the present invention. In FIG. 6, a scan line (not shown) and a driving data line (not shown) are formed in each pixel region P of the display region AA and on the first substrate 205. A driving TFT Td is formed at a crossing portion of the scan line and the driving data line. The driving TFT Td includes a driving gate electrode 225a, a driving gate insulating layer 245a, a driving semiconductor layer 240a and a driving source electrode 232a and a driving drain electrode 234a. For example, the driving semiconductor layer 240a includes a single layer of polycrystalline silicon. Alternatively, the driving semiconductor layer 240a includes two layers of an active layer and an ohmic contact layer. The active layer is formed of intrinsic amorphous silicon, the ohmic contact layer is formed of impurity-doped amorphous silicon.

In the non-display region, a scan pad 252 is formed on the first substrate 205, and a data pad 262 is formed on the driving gate insulating layer 245. The scan pad 252 is connected to the scan line, and the data pad 262 is connected to the data line.

A driving passivation layer 255a is formed on driving TFT Td and the gate insulating layer 245a. The driving passivation layer 255a includes first to third contact holes CH1, CH2 and CH3. The first contact hole CH1 through the driving passivation layer and the gate insulating layer 245a exposes the scan pad 252, and the second contact hole CH2 exposes the data pad 262. The third contact hole CH3 exposes the driving drain electrode 234a.

The first electrode 280 is formed on the driving passivation layer 255a. The first electrode 280 is connected to the driving drain electrode 234a through the third contact hole CH3. The first electrode 280 in one pixel region P is separated from the first electrode 280 in adjacent pixel region P. A scan pad electrode 254 and a data pad electrode 264 are formed on the driving passivation layer 255a. The scan pad electrode 254 is connected to the scan pad 252 through the first contact hole CH1, and the data pad electrode 264 is connected to the data pad 262 through the second contact hole CH2. In FIG. 6, each of the scan pad electrode 254 and the data pad electrode 264 is formed of a different material than the first electrode 280. However, the scan pad electrode 254 and the data pad electrode 264 may be formed of the same material as the first electrode 280.

A bank 260 is formed on the first electrode 280 and at boundaries of each pixel region P. Namely, the bank 260 has an opening corresponding to the pixel region P. The organic emitting layer 282 is formed on the first electrode 280 and in the opening of the bank 260. As mentioned above, the organic emitting layer 282 in one pixel region P is separated from the organic emitting layer 282 in adjacent pixel region P. Namely, the organic emitting layer 282 has an island shape. In addition, the second electrode 284 is formed on the organic emitting layer 282 and an entire surface of the display region. The first electrode 280, the organic emitting layer 282 and the second electrode 284 constitute the organic electroluminescent diode E. As mentioned above, the organic electroluminescent diode E serves as a light source so that light emitting from the organic emitting layer 282 is provided onto the liquid crystal layer 215 (of FIG. 5). The first electrode 280 is formed of a first metallic material having a relatively low work function. For example, the first metallic material may include one of calcium (Ca), magnesium (Mg) and aluminum (Al). The second electrode 284 is formed of a second metallic material having a relatively high work function. For example, the second metallic material may include one of ITO and IZO. Since the first electrode 280 is formed of the first metallic material having a low work function, a barrier between the first electrode 280 and the organic emitting layer 282 is decreased such that a high current density can be obtained. The second electrode 284 is formed of a transparent conductive material, such as ITO and IZO, such that light is provided onto the liquid crystal layer 215 (of FIG. 5) over the electroluminescent diode E. It may be called as a top emission type. The organic emitting layer 282 emits white light. In this embodiment, since the organic electroluminescent diode E is an active matrix type, light luminescence is controlled in each pixel region P.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A flexible liquid crystal display device, comprising:
   a first flexible substrate having a display region and a non-display region at a periphery of the display region;
   an organic electroluminescent diode including a first electrode on the first flexible substrate, an organic emitting layer on the first electrode and a second electrode on the organic emitting layer, wherein each of the first electrode, the organic emitting layer and the second electrode covering an entire surface of the display region;
   a buffer layer on the organic electroluminescent diode;
   a gate line on the buffer layer;
   a data line over the buffer layer and crossing the gate line to define a pixel region at the display region;
   a thin film transistor connected to the gate and data lines;
   a pixel electrode connected to the thin film transistor;
   a second flexible substrate facing the first flexible substrate;
   a common electrode on the second flexible substrate; and
   a liquid crystal layer between the pixel and common electrodes.

2. The flexible liquid crystal display device according to claim 1, further comprising:
   a black matrix on the second flexible substrate surrounding the pixel region and having an opening corresponding to the pixel region; and
   a color filter layer in the opening.

3. The flexible liquid crystal display device according to claim 1, wherein the first flexible substrate is formed of one of a plastic material, a metallic material and a metallic foil.

4. The flexible liquid crystal display device according to claim 3, wherein each of the metallic material and the metallic foil includes iron, iron alloy, aluminum and aluminum alloy.

5. The flexible liquid crystal display device according to claim 1, wherein the second flexible substrate is formed of a plastic material.

6. The flexible liquid crystal display device according to claim 3 or 5, wherein the plastic material includes one of polyethyleneterephthalate (PET), polyethersulphone (PES), polyimide (PI) and polyehylenenaphthalate (PEN).

7. The flexible liquid crystal display device according to claim 1, wherein the buffer layer includes a single layer of an inorganic insulating material including one of silicon oxide (SiO2) and silicon nitride (SiNx) or an organic insulating material including one of benzocyclobutene, photo-acryl and polyimide, or two layers of the inorganic insulating material and the organic insulating material.

8. The flexible liquid crystal display device according to claim 1, wherein the organic emitting layer is formed of an organic emitting material emitting a white light.

9. The flexible liquid crystal display device according to claim 1, wherein the first electrode is formed of an opaque metallic material including one of calcium (Ca), magnesium (Mg) and aluminum (Al).

10. The flexible liquid crystal display device according to claim 1, wherein the second electrode is formed of a transparent conductive material including one of indium-tin-oxide (ITO) and indium-zinc-oxide (IZO).

11. The flexible liquid crystal display device according to claim 1, wherein the first flexible substrate is opaque, and the second substrate is transparent.

12. The flexible liquid crystal display device according to claim 1, further comprising an inverter for controlling the organic electroluminescent diode.

13. The flexible liquid crystal display device according to claim 1, further comprising a sealing material pattern covering edges of the organic electroluminescent diode.

14. The flexible liquid crystal display device according to claim 1, further comprising a seal pattern at edges of the first and second flexible substrates to seal a space between the first and second flexible substrates.

15. A flexible liquid crystal display device, comprising:
   a first flexible substrate having a display region, pixel regions in the display region and a non-display region at a periphery of the display region;
   a driving element in each pixel region;
   an organic electroluminescent diode in each pixel region and including a first electrode connected to the driving element, an organic emitting layer on the first electrode and a second electrode on the organic emitting layer, wherein each of the first electrode and the organic emitting layer has an island shape, and the second electrode covering an entire surface of the display region;
   a buffer layer on the organic electroluminescent diode;
   a gate line on the buffer layer;
   a data line over the buffer layer and crossing the gate line to define a pixel region at the display region;
   a thin film transistor connected to the gate and data lines;
   a pixel electrode connected to the thin film transistor;
   a second flexible substrate facing the first flexible substrate;
   a common electrode on the second flexible substrate; and
   a liquid crystal layer between the pixel and common electrodes.

16. The flexible liquid crystal display device according to claim 15, wherein the organic emitting layer is formed of an organic emitting material emitting a white light.

17. The flexible liquid crystal display device according to claim 15, wherein the first electrode is formed of an opaque metallic material including one of calcium (Ca), magnesium (Mg) and aluminum (Al).

18. The flexible liquid crystal display device according to claim 15, wherein the second electrode is formed of a transparent conductive material including one of indium-tin-oxide (ITO) and indium-zinc-oxide (IZO).

19. The flexible liquid crystal display device according to claim 15, wherein the first flexible substrate is opaque, and the second substrate is transparent.

20. The flexible liquid crystal display device according to claim 15, wherein the organic electroluminescent diode in one pixel region is driving by the driving element in the one pixel region.

* * * * *